United States Patent
Doll et al.

(10) Patent No.: US 10,350,670 B1
(45) Date of Patent: *Jul. 16, 2019

(54) METHOD FOR MAKING A DUAL THREADED BOLT ROLL FORMING DIE

(71) Applicants: Mark Doll, Lincoln, CA (US); Zebula Doll, Lincoln, CA (US); Jim Flanagan, Worcester, MA (US); Adam Kettles, Lancaster, MA (US)

(72) Inventors: Mark Doll, Lincoln, CA (US); Zebula Doll, Lincoln, CA (US); Jim Flanagan, Worcester, MA (US); Adam Kettles, Lancaster, MA (US)

(73) Assignee: Mark Doll, Dayton, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,428

(22) Filed: Oct. 6, 2016

Related U.S. Application Data

(62) Division of application No. 14/249,081, filed on Apr. 9, 2014, now Pat. No. 9,757,792.

(51) Int. Cl.
  B21H 3/06 (2006.01)
  B23P 15/24 (2006.01)

(52) U.S. Cl.
  CPC .............. B21H 3/06 (2013.01); B23P 15/24 (2013.01)

(58) Field of Classification Search
  CPC .................................. B21H 3/022; B21H 3/06
  USPC ........................................ 72/88, 90; 76/101.1
  See application file for complete search history.

(56) References Cited

U.S. PATENT DOCUMENTS

| | | | | |
|---|---|---|---|---|
| 2,699,077 A | * | 1/1955 | Bedker | B21H 3/048 76/101.1 |
| 3,517,717 A | * | 6/1970 | Orlomoski | B21H 3/06 72/88 |
| 3,654,800 A | * | 4/1972 | Yankee | B21H 3/06 72/469 |
| 3,789,644 A | * | 2/1974 | Orlomoski | F16B 39/30 72/469 |
| 3,850,215 A | * | 11/1974 | Orlomoski | B21H 3/025 72/88 |
| 3,882,917 A | * | 5/1975 | Orlomoski | F16B 39/30 411/309 |
| 3,901,066 A | * | 8/1975 | Orlomoski | F16B 39/30 72/469 |
| 3,930,425 A | * | 1/1976 | Orlomoski | B21H 3/06 76/107.1 |
| 4,034,586 A | * | 7/1977 | Corrette | B21H 3/06 72/88 |

(Continued)

*Primary Examiner* — Jason Daniel Prone
(74) *Attorney, Agent, or Firm* — Heisler & Associates

(57) ABSTRACT

The die forming process includes first passing a circular coarse thread cutter over the forming surface of the die at an angle away from parallel to a side edge matching a pitch for coarse threads to be formed by the die. The coarse thread cutter is truncated with a notch within a flattened tip, the notch forming upper portions of crests in the forming surface of the die. A fine thread cutter of circular form is then utilized to cut portions of the root of the dual threaded die. The fine thread cutter is angled relative to side edges of the die at an angle substantially half of an angle at which the coarse thread cutter is angled. The fine thread cutter cuts at a variable depth as the fine thread cutter advances along the root between the crests to form flanks of a bridge within the root.

2 Claims, 7 Drawing Sheets

(56) References Cited

U.S. PATENT DOCUMENTS

| | | | | |
|---|---|---|---|---|
| 4,237,948 A * | 12/1980 | Jones | ............ | F16B 39/30 411/307 |
| 4,393,676 A * | 7/1983 | Prosdocimo | ............ | B21H 3/06 72/92 |
| 4,563,890 A * | 1/1986 | Dickson | ............ | B21H 3/06 72/88 |
| 4,631,947 A * | 12/1986 | Corrette | ............ | B21H 3/06 72/88 |
| 4,713,954 A * | 12/1987 | Corrette | ............ | B21H 3/06 72/88 |
| 4,735,537 A * | 4/1988 | Rath | ............ | B21H 3/06 72/88 |
| 6,053,683 A * | 4/2000 | Cabiran | ............ | F16B 37/14 411/374 |
| 6,149,363 A * | 11/2000 | March | ............ | B21H 3/06 72/88 |
| 6,216,510 B1 * | 4/2001 | Hashimoto | ............ | F16B 39/30 72/103 |
| 6,324,887 B1 * | 12/2001 | Sharp | ............ | B21H 3/06 72/88 |
| 6,516,650 B1 * | 2/2003 | Watanabe | ............ | B21H 3/06 72/88 |
| 7,156,600 B2 * | 1/2007 | Panasik | ............ | B21H 3/02 411/411 |
| 7,159,429 B2 * | 1/2007 | Takemasu | ............ | B21H 3/02 72/103 |
| 7,217,195 B2 * | 5/2007 | Matsubayashi | ............ | B21H 3/022 470/185 |
| 8,899,898 B2 * | 12/2014 | Rosenkranz | ............ | B21H 3/06 411/411 |
| 9,017,176 B2 * | 4/2015 | Hettich | ............ | B21H 3/06 470/10 |
| 9,140,292 B2 * | 9/2015 | Lu | ............ | F16B 39/28 411/307 |
| 9,192,980 B2 * | 11/2015 | Hettich | ............ | B21H 3/06 72/88 |
| 9,757,792 B1 * | 9/2017 | Doll | ............ | B21H 3/022 76/107.1 |
| 2001/0053317 A1 * | 12/2001 | Unsworth | ............ | F16B 25/0031 411/411 |
| 2002/0112524 A1 * | 8/2002 | Caton | ............ | B21H 3/06 72/469 |
| 2003/0156921 A1 * | 8/2003 | Nagawa | ............ | F16B 39/30 411/411 |
| 2005/0217345 A1 * | 10/2005 | Taniguchi | ............ | B21H 3/06 72/469 |
| 2006/0169015 A1 * | 8/2006 | Garver | ............ | B21H 3/06 72/103 |
| 2007/0264100 A1 * | 11/2007 | Fujii | ............ | B21H 3/06 411/411 |
| 2013/0102401 A1 * | 4/2013 | Hudson | ............ | B23G 1/02 72/95 |
| 2013/0324270 A1 * | 12/2013 | Wu | ............ | B21H 3/06 470/9 |
| 2014/0241827 A1 * | 8/2014 | Park | ............ | B21K 1/70 411/172 |

* cited by examiner

METHOD FOR MAKING A DUAL THREADED BOLT ROLL FORMING DIE

CROSS-REFERENCE TO RELATED APPLICATIONS

This application is a divisional of U.S. patent application Ser. No. 14/249,081, filed on Apr. 9, 2014 (now U.S. Pat. No. 9,757,792).

FIELD OF THE INVENTION

The following invention relates to dies for roll forming of dual threaded screws, such as bolts, so that they can hold both a coarse thread nut on coarse threads at a first helix angle and a fine thread nut or otherwise attach to other threaded elements through fine threads at a second helix angle which is less than the first helix angle. More particularly, this invention relates to methods and tools for forming such a die by cutting the forming surface of the die with appropriate tools to have the required contour. When "cutting" is referenced, this term generally refers to all forms of material removal (including "grinding"), regardless of the particular material removal mechanism employed.

BACKGROUND OF THE INVENTION

Screws come in a variety of different configurations generally including threads on a portion of a substantially cylindrical shaft which extends between a head and a tip. One form of screw is configured for use along with a nut or other structure having a threaded hole, which nut threads mate with threads on the screw so that the nut or other threaded structure can be coupled to the screw by simultaneously rotating and translating the shaft into and through the hole in the nut or other threaded hole. When a screw is configured for use with a nut it is often referred to as a bolt.

The threads on the shaft of the screw have a variety of characteristics. Some of these characteristics include a helix angle, also called a pitch angle, which is an angle at which the threads are oriented relative to a plane perpendicular to a central axis of the shaft of the screw. The greater the pitch angle, the greater the axial distance that a nut will travel when rotated a similar number of turns. Another characteristic of threads is their size, such as measured between a minor diameter and a major diameter of the threads. Threads which are generally larger are often referred to as "coarse threads" while threads which are relatively smaller are often referred to as "fine threads." When adjacent turns of threads are directly adjacent to each other, and when a diameter of the shaft of the screw is known, the pitch angle of the threads and the relative size of the threads become linked together. Coarser threads will have a greater pitch angle and finer threads will have a lesser pitch angle if the diameter of the shaft remains the same and if the threads of adjacent turns are provided without a space therebetween.

One unique type of screw is known in the prior art as a dual threaded screw. Generally, a dual threaded screw has both a coarse thread with a first relatively large helix angle and at least portions of a second fine thread having a lesser helix angle formed on the same screw. Such a dual threaded screw is described in U.S. Pat. No. 7,159,429, incorporated herein by reference in its entirety. A dual threaded bolt B providing one example of such a dual threaded screw is shown herein in FIGS. 1-6. A unique aspect of such a dual threaded bolt B is its ability to have nuts N, L having threads of different pitches both threaded onto the same bolt B with the first nut N providing a basic fastening function, and the second nut L being tightenable against the first nut N to act as a lock nut to keep the nuts N, L from moving relative to the bolt B.

Screws can be manufactured in a variety of different ways including machining of the threads, turning of the threads on a lathe or rolling of the threads between dies. Often, rolling threads onto a screw is the most efficient screw thread forming method. However, dual threaded screws do not lend themselves to straightforward roll forming between appropriately threaded dies. In particular, if one sequentially utilizes coarse threaded dies and then fine threaded dies, one can form the coarse threads onto the screw, but then when the fine threads are formed onto the screw with the fine threaded dies, the coarse threads are to some extent damaged. If the fine threads are first formed onto the shaft of the screw and then the coarse threads are formed, the dies forming the coarse threads will damage the fine threads.

It is taught in the above-identified U.S. Pat. No. 7,159,429 to provide a die having contours thereon which are appropriate to result in the formation of both the coarse thread and the fine thread, simultaneously onto the shaft of the screw. The particular geometry of such a roll forming die is described in U.S. Pat. No. 7,159,429.

While this die geometry for forming the dual threaded screw is disclosed in U.S. Pat. No. 7,159,429, this die geometry is rather complex and is of a character which makes forming of this die exceptionally difficult. This difficulty is enhanced when considering that materials from which roll forming dies are formed must be significantly harder than the material roll formed thereby. Because screws are typically formed of steel or other relatively hard materials, the dies must be formed of exceptionally hard material (e.g. tool steel) and yet must still have the complex geometry necessary to simultaneously form both coarse and fine threads. Harder materials are harder to form into their required shape, for instance requiring grinding instead of cutting.

Accordingly, a need exists for a method to form the complex geometry of a die suitable to roll form a dual threaded screw.

SUMMARY OF THE INVENTION

With this invention a method for forming a die with the geometry required for roll forming of a dual threaded screw is provided, along with unique equipment required for this die forming process. The die to be formed has a forming surface which is typically flat and typically extending between a lead edge and rear edge on opposite sides of the forming surface and with a pair of side edges extending between the two lead edges and also defining lateral edges of the forming surface. The forming surface of the die has a series of crests thereon which extend linearly like a series of parallel ridges between the two leading edges. Roots are provided between each of these crests, which also extend between the two leading edges. These crests and roots are angled relative to the side edges, in a preferred form of this invention, with an angle matching a coarse thread pitch angle for the dual threaded screw to be formed by the die.

Uniquely, the root between each crest is spanned by a plurality of bridges. These bridges have a start on a side of a crest facing the root and a stop on a side of another crest also facing the same root. Each root has a plurality of bridges that span it, with the bridges parallel to each other and angled relative to an angle of the crests and roots. The bridges have an angle generally matching a desired pitch angle for the fine threads of the dual threaded screw to be formed by the die.

To provide the die with the required contours in the forming surface according to this invention at least two cutting tools are utilized. The cutting tools are formed from a tool steel or other material which is harder than the material from which the die is formed, so that the contour in the forming surface of the die can be cut by these cutting tools. A first cutting tool is a truncated coarse thread cutter. This cutter is a circular cutter with teeth extending radially from a circular perimeter thereof, the teeth separated by gullets. Each tooth extends to a tip with the tip defined by a pair of shoulders which taper toward each other and then a flat region at the tip, and with a notch in the flat region. The overall width of this flat region is preferably similar to a width of upper portions of the coarse thread plus portions of roots on either side of each coarse thread crest. The notch has a depth preferably similar to a height that the crests of the die extend above the fine thread forming bridge which spans each root between each crest.

This truncated coarse thread cutter makes a series of passes against the forming surface of the die with these passes extending generally from a lead edge to a rear edge. However, these passes occur at an angle relative to the side edges similar to a pitch desired for the bolt or other screw threads. For instance, if a pitch of 10° is desired, the truncated coarse thread cutter passes between the lead edge and rear edge at a 10° angle relative to the side edges. The truncated coarse thread cutter preferably makes one pass for each coarse thread. When these passes are completed, the dual threaded die is partially formed with upper portions of the crests formed therein and with flats between adjacent crests.

Next, a fine thread cutter is used. This fine thread cutter is also a circular cutter with a plurality of teeth extending radially from a circular perimeter thereof. Each tooth is spaced from adjacent teeth by a gullet and with beveled shoulders extending to a tip. With the fine cutter, the tip extends almost to a point, with only a very small rounded/ flattened extreme extent of the tip being provided.

The fine thread cutter is angled relative to side edges of the die at an angle less than (and preferably half of) the angle that the coarse thread cutter was angled relative to the side edges. For instance, if the coarse thread cutter was angled at 6° relative to the side edges, the fine thread cutter could be angled at 3° or 2° (or other angles). The fine thread cutter makes a series of cuts along each root between adjacent coarse threads in the forming surface of the die. Two such cuts with the fine cutter are provided as flank cuts for opposite flanks of each bridge. These flank cuts begin shallow near the start of each bridge and then transition to being deep when the tip of the cutter reaches a maximum depth for the root between adjacent coarse threads and approximately midway between a start and a stop of each bridge. This maximum depth can be maintained for some distance of the flank cut or can merely be a point of greatest depth. The fine cutter then transitions to becoming more shallow as the fine cutter approaches the stop of each bridge. The fine thread cutter thus avoids cutting into the flanks or crests of the coarse thread forming structure on the die. The taper angle of the shoulder of the fine thread cutter is preferably similar to an angle of the sides of the crests which is provided by the tapering sides of the notch within the truncated coarse thread cutter. Two flank cuts are provided for opposite sides of each bridge within each root between adjacent crests. As each root has multiple bridges, multiple sets of flank cuts are required within each root. Once all of the flank cuts have been made by the fine cutter within each of the roots between adjacent crests, the forming surface has been completed and the dual threaded die is ready for use, such as in forming a dual threaded bolt.

A second standard die is preferably provided along with the dual threaded die. This standard die only has coarse threads thereon with such coarse threads extending between a crest and a root which have a similar pitch and similar size to the coarse threads associated with the dual threaded die. The standard die and the dual threaded die are oriented facing each other and spaced apart by a diameter of the bolt or other item to be threaded with dual threads. This item is then rolled between the pair of dies to produce the finished dual threaded bolt or other item.

OBJECTS OF THE INVENTION

Accordingly, a primary object of the present invention is to provide a method for forming a die so that it can be used to roll form a dual threaded screw having both a coarse thread and a fine thread thereon.

Another object of the present invention is to provide an efficient method for making a die suitable for roll forming a dual threaded screw and in turn efficiently forming dual threaded screws.

Another object of the present invention is to provide a method for forming a die which can roll form a high quality dual threaded screw.

Another object of the present invention is to provide a method for forming a dual threaded die which involves substantially only machining of a forming surface of the die.

Another object of the present invention is to provide a dual threaded die forming method which can be quickly and easily performed.

Another object of the present invention is to provide a dual threaded die forming method which can achieve high precision in contouring the forming surface of the die.

Another object of the present invention is to provide cutters for use in contouring a forming surface of a dual threaded die.

Another object of the present invention is to form a dual threaded die whereby the die machining operation forms the dual threads of the screw in a manner that cannot be altered by the roll thread forming operation; ensuring consistent formed thread features when finished.

Other further objects of the present invention will become apparent from a careful reading of the included drawing figures, the claims and detailed description of the invention.

DESCRIPTION OF THE PREFERRED EMBODIMENT

Figure 19:
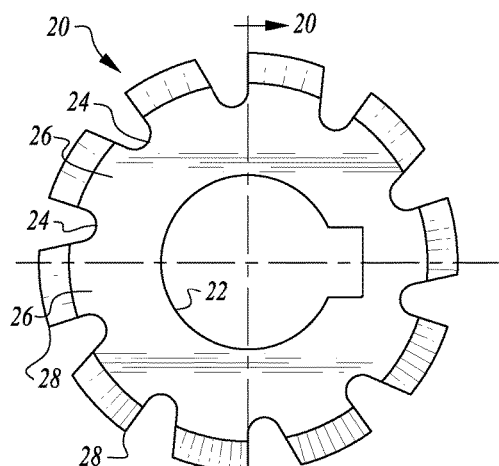
FIG. 19 is a side elevation view of a fine thread cutter for making fine thread cuts according to this invention.
Figure 22:
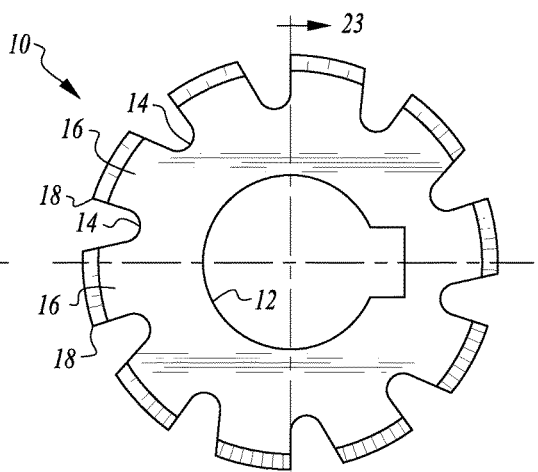
FIG. 22 is a side elevation view of a truncated coarse thread cutter for forming upper portions of coarse threads in the die according to this invention.
Figure 20:
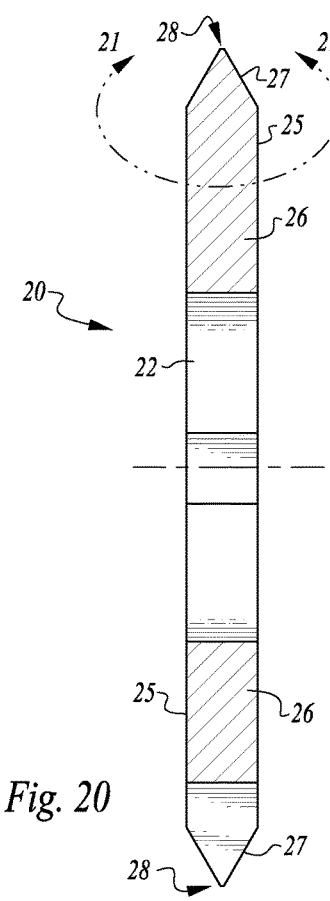
FIG. 20 is a front full sectional view of the fine cutter of FIG. 19.
Figure 23:
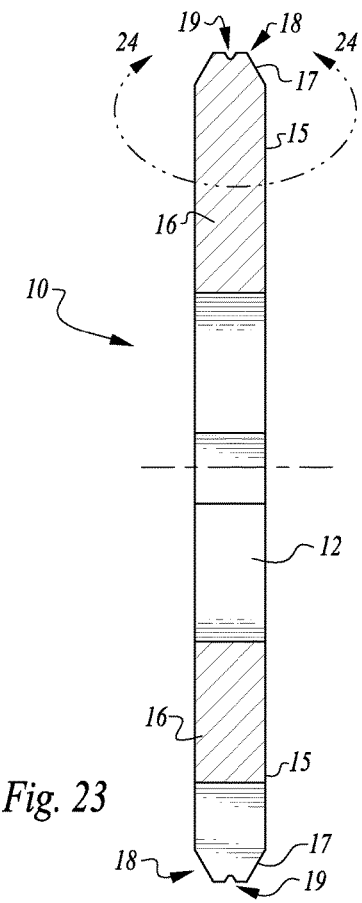
FIG. 23 is a front full sectional view of the coarse cutter of FIG. 22.
Figure 21:
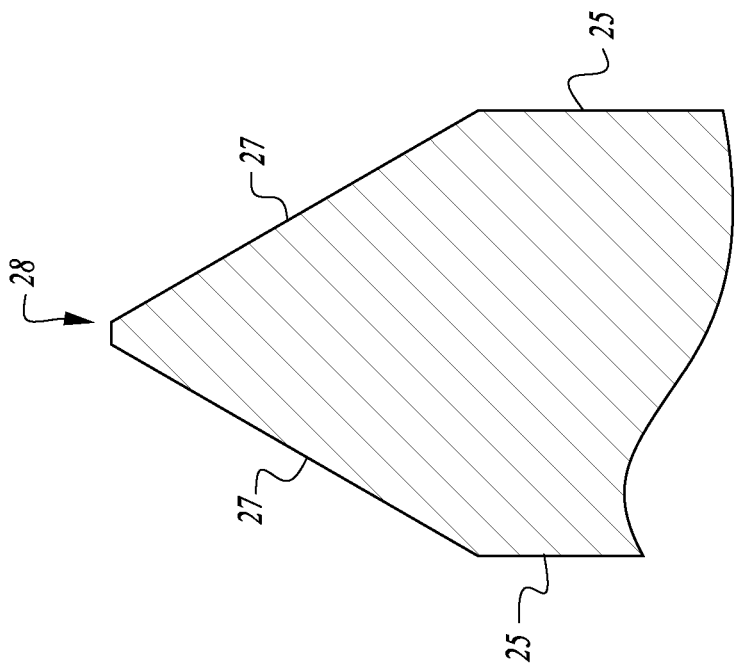
FIG. 21 is a detail of a portion of that which is shown in FIG. 20, revealing details of a tip of the fine cutter according to this invention.

Referring to the drawings, wherein like reference numerals represent like parts throughout the various drawing figures, reference numeral 10 is directed to a truncated coarse thread cutter (FIGS. 22-24) and reference numeral 20 is directed to a fine thread cutter (FIGS. 19-21). The cutters 10, 20 are used in a method for forming a dual threaded roll forming die 40. The die 40 has a configuration particularly contoured upon a forming surface 42 to allow the die to roll form a dual threaded screw such as a dual threaded bolt B (FIGS. 1-6). The cutters 10, 20 (FIGS. 19-24) for use in performing the method of this invention are also disclosed herein and included as part of this invention. The method of forming the dual threaded die 40 involves using the coarse thread cutter 10 first, and then the fine thread cutter 20 to form the various contours of the dual threaded die 40, so that it can roll form a dual threaded screw, such as the dual threaded bolt B.

Preliminarily, and with reference to FIGS. 1-6, basic details of the dual threaded bolt B are described, defining one embodiment of a dual threaded screw formable by roll forming with a dual threaded die such as the die 40 also described herein. The dual threaded bolt B is characterized by having both a coarse thread C and a fine thread F on a common shaft S extending between a head H and a tip T of the bolt B. The coarse thread C and fine thread F each have helix angles, also called pitch angles, associated therewith which differ from each other. As an example, the coarse thread C might have a first pitch angle of 8° and the fine thread F might have a second pitch angle of 4°. Most typically, the coarse thread C will have a pitch angle which matches some standard in the art for coarse threaded bolts. The fine thread F will then have a pitch angle which is exactly half of the pitch angle of the coarse thread C. In other embodiments, the fine thread F second pitch angle can be some other whole fraction of the coarse thread C first pitch angle (i.e. 8/3°, 2°, 8/5°, etc.). While generally less desirable, other pitch angles for the fine threads F could also be provided.

A nut N is provided with a female coarse thread matching the coarse thread C on the dual thread bolt B. A lock nut L is provided with a fine female thread which matches the fine thread F on the dual threaded bolt B. The female threads of the nut N coact with the coarse thread C on the dual threaded bolt B to advance the nut N, by rotation along a central axis of the shaft S. The lock nut L has its fine female threads coact with the fine threads F which are formed into portions of the coarse threads C so that the lock nut L can also advance by rotation along the central axis of the shaft S.

A similar number of turns for the nut N and the lock nut L will cause the nut N to advance twice as far (or some other number of turns in other embodiments) as the lock nut L. When the lock nut L is advanced toward the nut N while the nut N is stationary, the lock nut L will tighten against the nut N and tend to cause both the nut N and lock nut L to both be securely held to the shaft S of the bolt B.

With particular reference to FIGS. 7-12, details of the dual threaded die 40 are described, according to this preferred embodiment. This dual threaded die 40 largely has geometry details similar to those disclosed in U.S. Pat. No. 7,159,429, incorporated herein by reference in its entirety. The die 40 has a forming surface 42 parallel and opposite a back surface. A lead edge 44 and a rear edge 48 are provided on opposite ends of the forming surface 42 and extend from the forming surface 42 down to the back surface. A pair of side edges 46 are parallel and opposite each other and extend from the forming surface 42 down to the back surface and also extend between the lead edge 44 and rear edge 48. The die 40 thus has a generally orthorhombic structure with three pairs of mutually parallel sides which are perpendicular to the other pairs of sides.

The forming surface 42 defines that portion of the die 40 which acts upon the shaft S of the bolt B or other screw with sufficient pressure and rolling motion to cause the coarse thread C and fine thread F to be simultaneously formed into the shaft S of the bolt B. In particular, this forming surface 42 includes a root 50 and crest 60 which each extend between the lead edge 44 and rear edge 48 and are provided in an alternating pattern between the two side edges 46. The root 50 and crest 60 are not oriented entirely parallel with the side edges 46 in this preferred embodiment. Rather, they are angled with this angle of the root 50 and tip 60 relative to the side edges 46 being similar to a pitch angle of the coarse threads C of the bolt B.

The crest 60 of the die 40 is preferably substantially unaltered by portions of the forming surface 42 which are provided to form the fine thread F on the dual threaded bolt B. The root 50 is interrupted by contours of the forming surface 42 which are provided to form the fine threads F on the dual threaded bolt B. In particular, each root 50 includes a plurality of bridges 52 spanning the root 50. Each bridge 52 extends from a start 54 to a stop 56. The start 54 is on one side of the root 50 and the stop 56 is on an opposite side of the root 50. Thus, the start 54 extends out of one crest 60 adjacent the root 50 and the stop 56 ends into a crest 60 on an opposite side of the root 50. Extending down the root 50 another bridge 52 preferably has a start 54 which is provided before the stop 56 of the previous bridge 52. Thus, there is some overlap between each bridge 52 within each root 50.

These bridges 52 preferably have a highest portion thereof which is substantially flat and parallel lie in a plane below a plane in which the tips of the crests 60 lie. The bridges 52 preferably have an angle relative to the root 50 which is similar to a difference between the pitch angle of the coarse thread C and a pitch angle of the fine thread F. Where the pitch angle of the coarse thread C is matched by an angle of the root 50 relative to the side edges 56 of the die 40, the bridges 52 also have an angle relative to the side edges 46 which matches a pitch angle for the fine thread F of the dual threaded bolt B. Stated alternatively, the bridges 52 have an angle that is closer to parallel with the side edges 46 than the root 50 angle.

Figure 1:
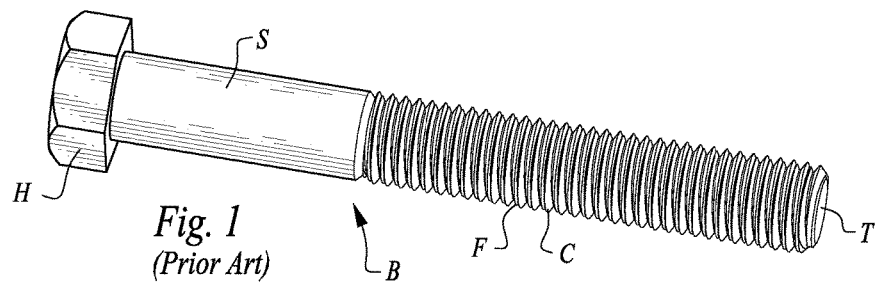
FIG. 1 is a perspective view of a dual threaded bolt defining one form of dual threaded screw formable utilizing the dual threaded die which is formed by a method of this invention.
Figure 2:
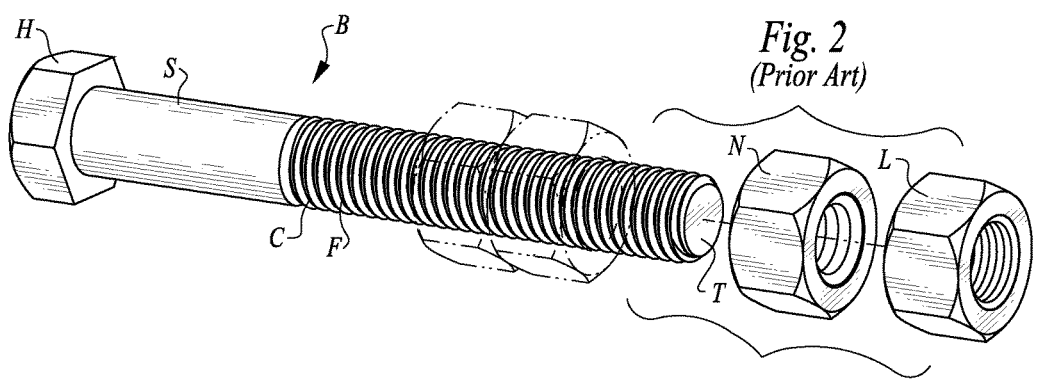
FIG. 2 is a perspective view of that which is shown in FIG. 1 along with a pair of nuts, one having coarse threads and the other fine threads, and both rotatably supportable upon the bolt.
Figure 3:
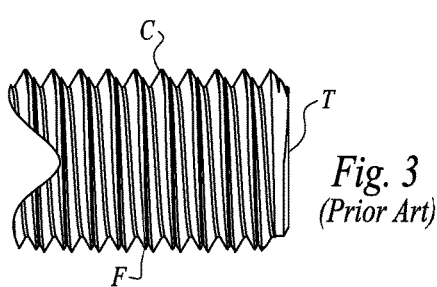
FIGS. 3-6 are side elevation views of the coarse and fine threads which are formed into the bolt by the dual threaded die which is shaped by a method of this invention.
Figure 5:
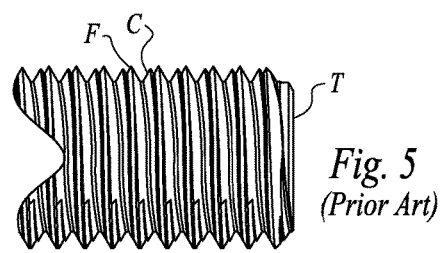
Figure 4:
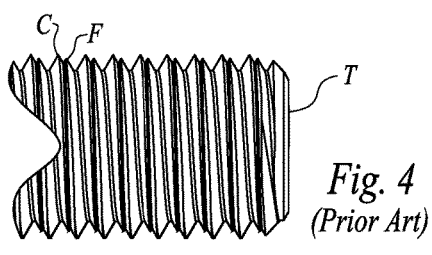
Figure 6:
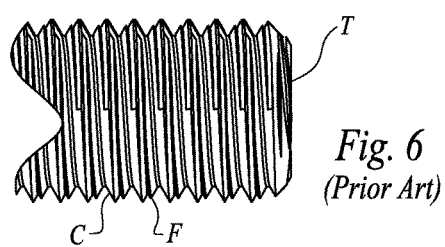
Figure 7:
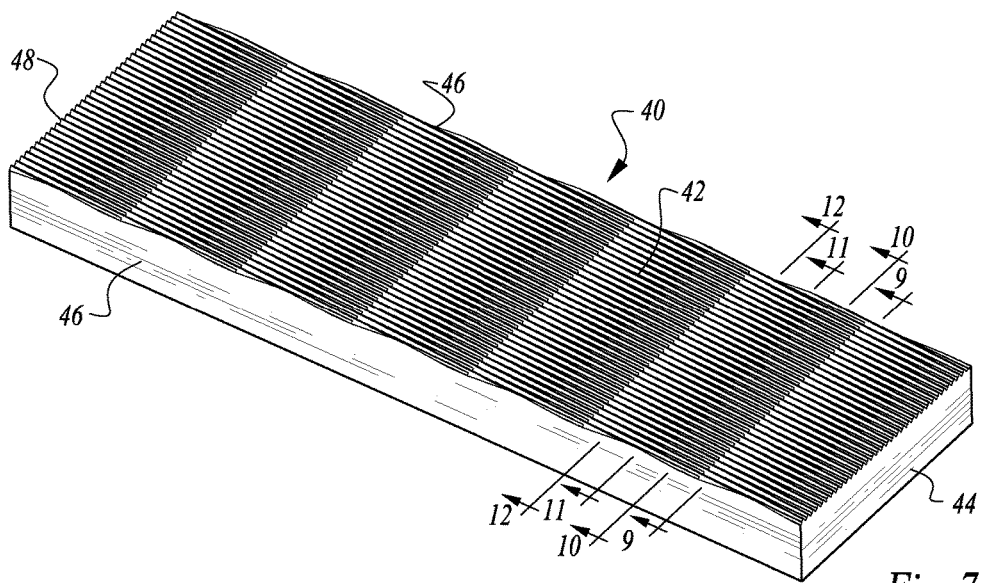
FIG. 7 is a perspective view of a dual threaded die formed by the method of this invention and suitable for use in roll forming of dual threaded screws therewith.
Figure 8:
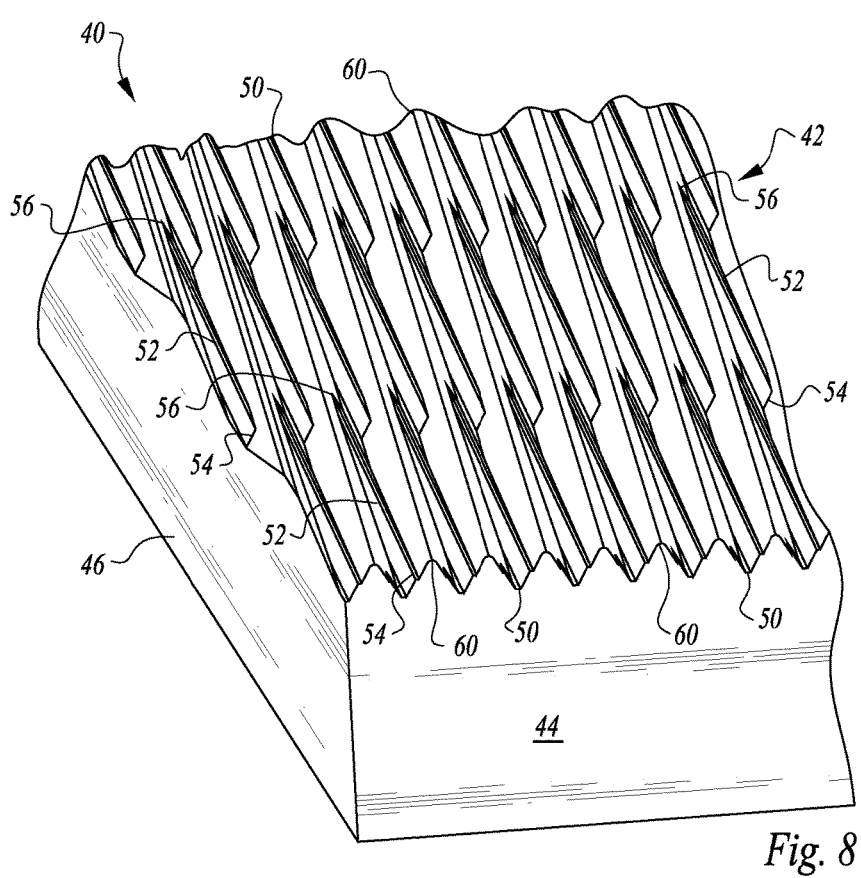
FIG. 8 is a detailed perspective view of a portion of that which is shown in FIG. 7.
Figure 9:
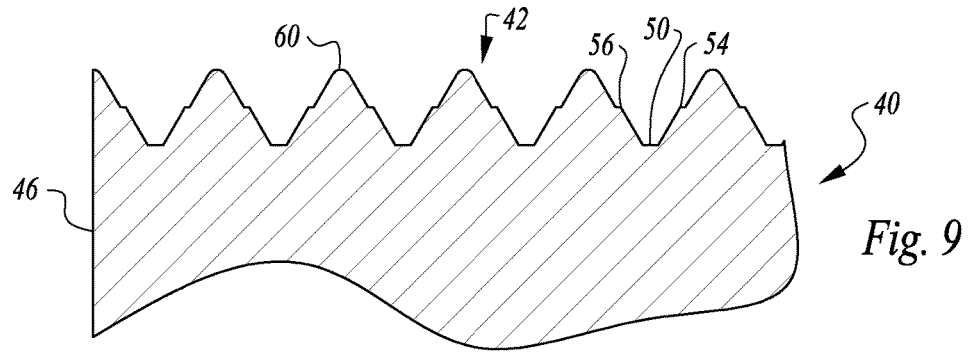
FIGS. 9-12 are sectional views of portions of that which is shown in FIG. 7, the views taken along corresponding lines of FIG. 7 and further revealing details of the contour of a forming surface of the dual threaded die formed by the method of this invention.
Figure 10:
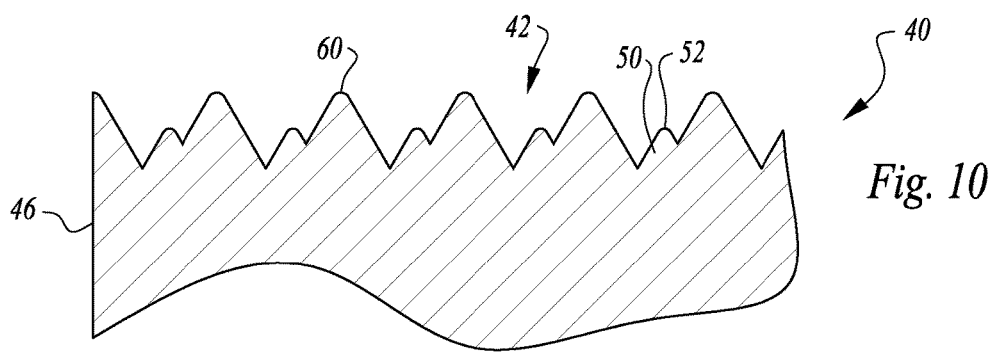
Figure 11:
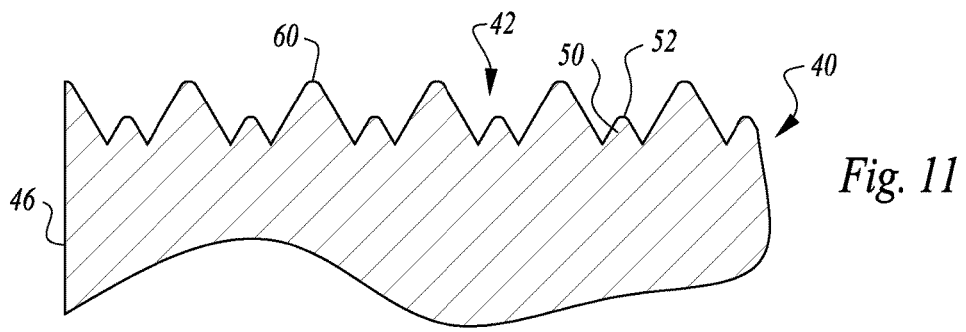
Figure 12:
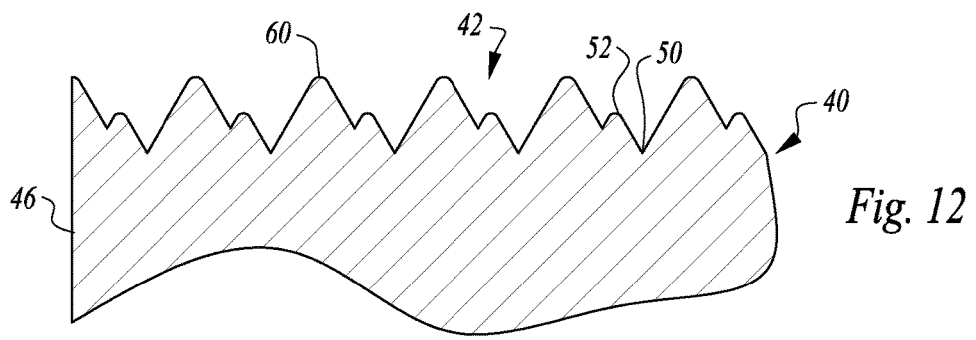
Figure 13:
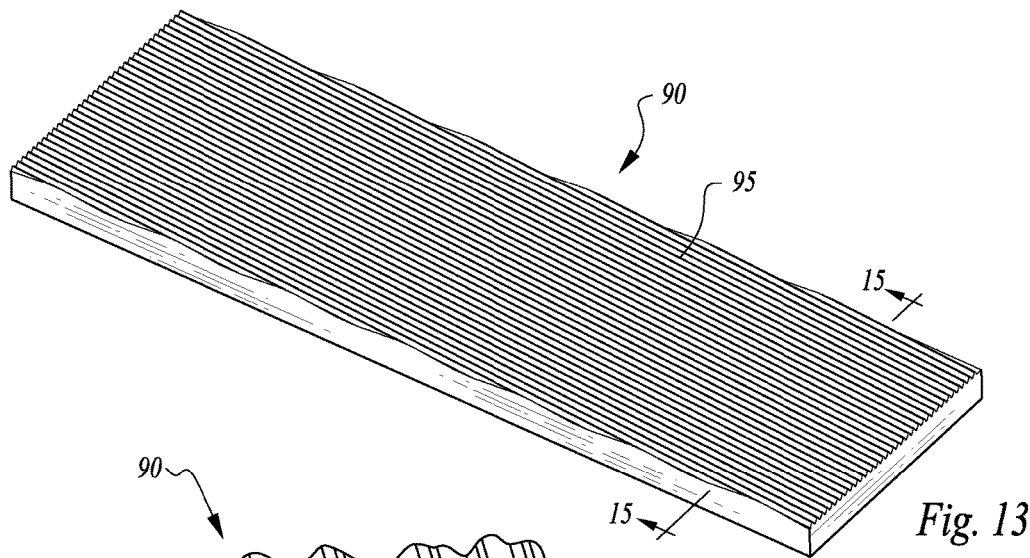
FIG. 13 is a perspective view of a standard coarse thread die for use with the die of FIG. 7 in forming a dual threaded screw.
Figure 14:
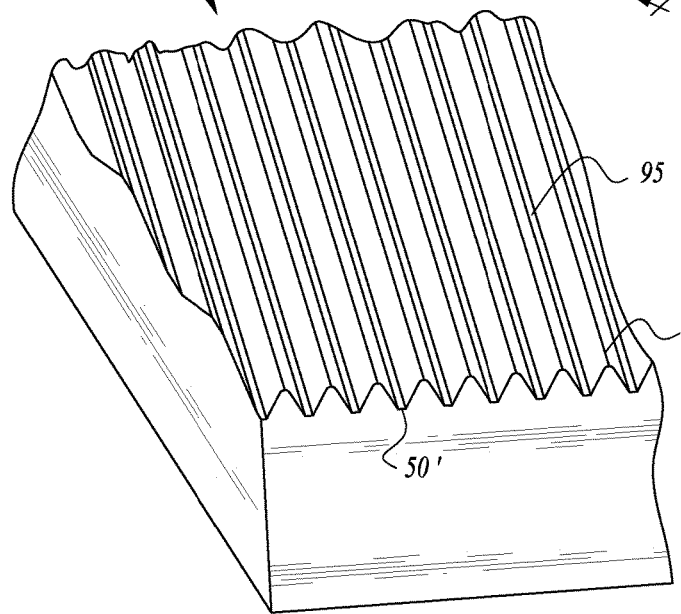
FIG. 14 is a detailed perspective view of a portion of that which is shown in FIG. 13.
Figure 15:
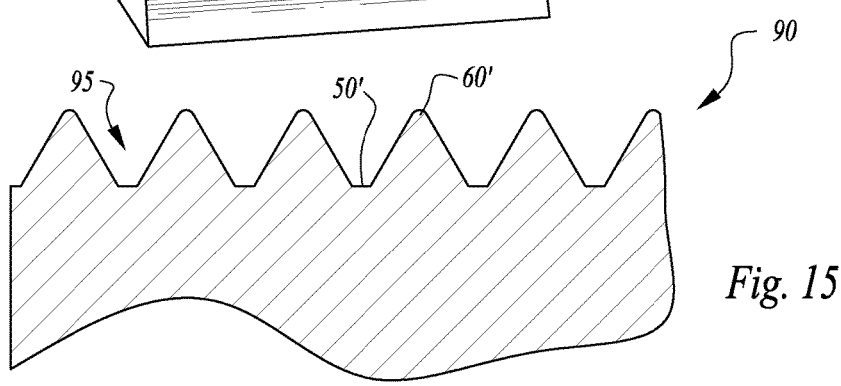
FIG. 15 is a sectional view of a portion of that which is shown in FIG. 13, taken along line 15-15 of FIG. 13.

The particular contour of the bridge 52 is further exemplified by the series of sectional views shown in FIGS. 9-12. In FIG. 9, a root 50 can be seen with a start 54 on a right side of the root 50 and a stop 56 of a previous bridge 52 on a left side of the root 50. In FIG. 10 it can be seen that the bridge 52 has extended further from the right side of the root 50 and the previous bridge 52 is no longer visible. In FIG. 11 it can be seen that the bridge 52 is now midway between the right side of the root 50 and the left side of the root 50. In FIG. 12 it can be seen that the bridge 52 is now closer to the left side of the root 50 than the right side. A next sequential view after FIG. 12 would be similar to FIG. 9, where a stop 56 of a bridge 52 is seen adjacent the left side as well as a start 54 of another bridge 52 on the right side and further down the same root 50.

In a preferred embodiment the bridge 52 has a height which is substantially half of a height of the crest 60 above the root 50. Other relative heights of the bridge 52 could be provided, depending on the desired height for the fine thread F extending into the coarse thread C. Parts of the crests 60 above the bridges 52 are referred to herein as upper portions of the crests.

With this invention, the dual thread roll forming die 40 is formed by machining the forming surface 42 of the die 40 with various mechanical cutters to cut away material from the die 40 until the forming surface 42 remains. Most preferably according to this preferred embodiment, two circular cutters 10, 20 are utilized with teeth extending radially from circular perimeters thereof to cut the die 40 and leave the forming surface 42. These circular cutters include a truncated coarse thread cutter 10 (FIGS. 22-24) and a fine thread cutter 20 (FIGS. 19-21). While these cutters 10, 20 are most preferred in this embodiment, at least one of these cutters could have its function at least partially replaced by other forms of mechanical cutting tools. For instance, the function of the truncated coarse thread cutter 10 could conceivably at least partially be replaced or complemented by machining with an end mill, or grinding wheel.

The coarse thread cutter 10 is configured to form the upper portion of the coarse threads which define the crest 60. This coarse thread cutter 10 includes a body formed of sufficiently high strength and hardness tool steel to be able to cut the material from which the die 40 is made. A center hole 12 is preferably provided within a center of this body.

Teeth 16 extend radially from a center of the cutter 10 with gullets 14 between adjacent teeth 16. Each tooth 16 extends to a tip 18. Sides 15 of the teeth 16 are beveled, preferably at a constant angle so that the tip 18 is narrower than the sides 15. The tapering of these sides 15 defines shoulders 17 which are sharpened along with the tip 18 at edges thereof adjacent the gullet 14 for cutting to occur.

Importantly, the tip 18 is flattened at a flat central portion between the shoulders 17 and includes a notch 19 in a center of this flat central portion defining the tip 18. The notch 19 has a depth similar to a desired height for the upper portion of the crest 60. The upper portion of the crest 60 is at least that portion of the crest 60 which extends above the bridges 52 within the roots 50 in the forming surface 42. This distance is also typically similar to a difference in size between the coarse threads and the fine threads in the forming surface 42 of the die 40. The notch 19 has tapering slopes 13 which taper at an angle similar to a desired angle of taper for flanks of the crest 60 extending down from the crest 60 in the forming surface 42 of the die 40. A lowermost portion of the notch 19 is preferably rounded somewhat so that the crest 60 is provided with a somewhat rounded contour. The angle of the slopes 13 are preferably similar to each other and similar to an angle of the shoulders 17.

Figure 16:
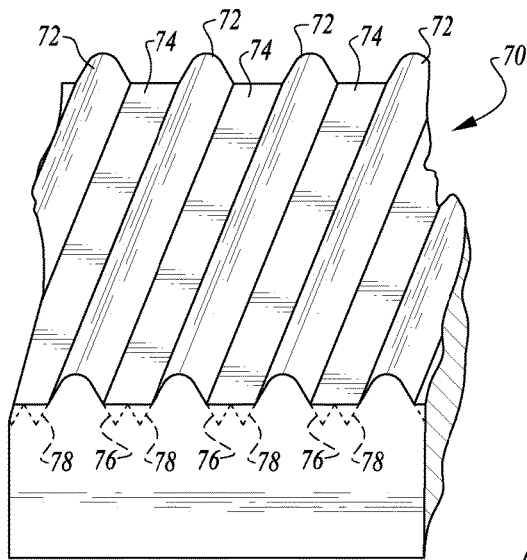
FIG. 16 is a detail of a partially formed dual threaded die which is in the process of being formed into the dual threaded die of FIGS. 7-12, after having been cut by the truncated coarse thread cutting tool of FIGS. 22-24.

With particular reference to FIG. 16, a partially formed dual threaded die 70 is shown after having been cut by the truncated coarse thread cutter 10. This partially formed die 70 includes coarse thread crests 72 parallel to each other and angled relative to the side edges 46 (FIGS. 7-12). This angling matches a coarse thread first pitch angle for the dual threaded die 40. The angle is preferably provided by merely angling the truncated coarse thread cutter 10 relative to the mass of material to be formed into the dual threaded die 70 (or vice versa) so that as the cutter makes passes over the forming surface (or vice versa), the coarse thread crests 72 are provided with this desired angle. One pass of the truncated coarse thread cutter 10 is provided for each coarse thread crest 72.

This truncated coarse thread cutter 10 also forms flats 74 between adjacent coarse thread crests 72. When the truncated coarse thread cutter 10 makes a second pass over the partially formed dual threaded die 70, flat portions of the tip 18 can overlap upon the flat 74 of a previously formed coarse thread crest 72 somewhat if desired. When the truncated coarse thread cutter 10 has completed a number of passes equal to a number of coarse thread crests 72 desired for the die 40, the partially formed dual threaded die 70 will have a form similar to that depicted in FIG. 16. The partially formed dual threaded die 70 is then ready to be machined by the fine thread cutter 20 to form the root 50 with the bridges 52 therein (FIGS. 8-12) as described in detail below. While a single truncated coarse thread cutter 10 would typically make multiple passes to form the partially formed die 70, multiple truncated coarse thread cutters 10 could be mounted on a common shaft and cut multiple crest upper portions 72 and flats 74 simultaneously. Similarly, a single truncated cutter with a wider flat portion and multiple notches could be used to cut multiple crest upper portions 72 and flats 74.

Figure 24:
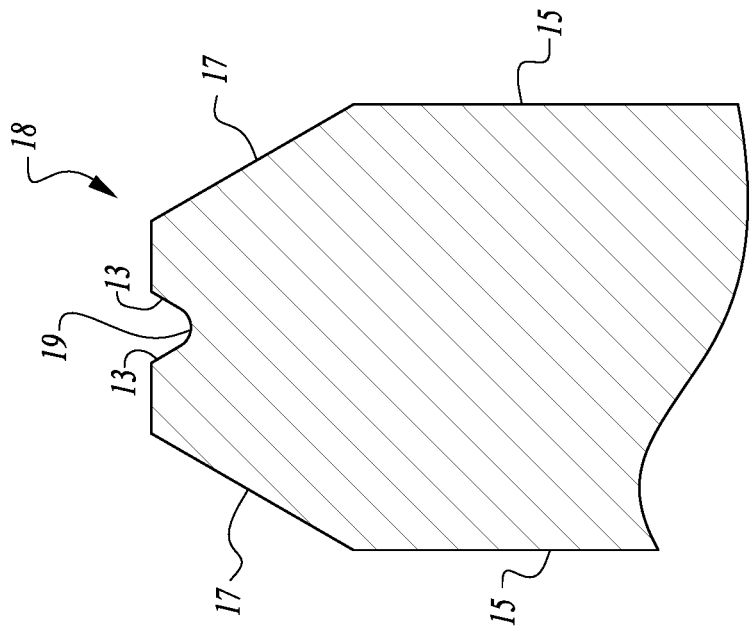
FIG. 24 is a detail of a portion of that which is shown in FIG. 23 showing details of a tip of the coarse cutter, including a notch therein.

The fine thread cutter 20 (FIGS. 19-21) includes a thin body of hardened steel or other material sufficiently strong and hard to facilitate machining of the material forming the dual threaded die 40. This fine thread cutter 20 includes a central hole 22 and extends out to a circular perimeter with a plurality of teeth 26 extending radially therefrom, with gullets 24 between each tooth 26. The teeth 26 extend up to a tip 28. Sides 25 of the teeth 26 end at shoulders 27 which are beveled at an angle preferably matching an angle of sides of the notch 19 in the truncated coarse thread cutter 10 (FIG. 24).

The shoulders 27 which have edges sharpened adjacent the gullet 24 along with the tip 28 to facilitate cutting. While these shoulders 27 have a significant length, only a small portion of the shoulders 27 directly adjacent the tip 28 actually perform any cutting, with remaining portions of the shoulders 27 merely supporting the tip 28 and portions of the shoulders 27 adjacent the tip 28. The tip 28 and portions of the shoulders 27 adjacent the tip 28 are sufficiently fine that they can cut the root 50 including the bridge 52 spanning the root 50 between adjacent crests. The fine thread cutter 20 makes two flank cuts to form opposite sides of each bridge 52. The diameter of the fine thread cutter 20 can be reduced if necessary, especially on dies for smaller dual threaded screws, such as the bolts B (FIGS. 1-6) so that these flank cuts can be properly made.

Figure 17:
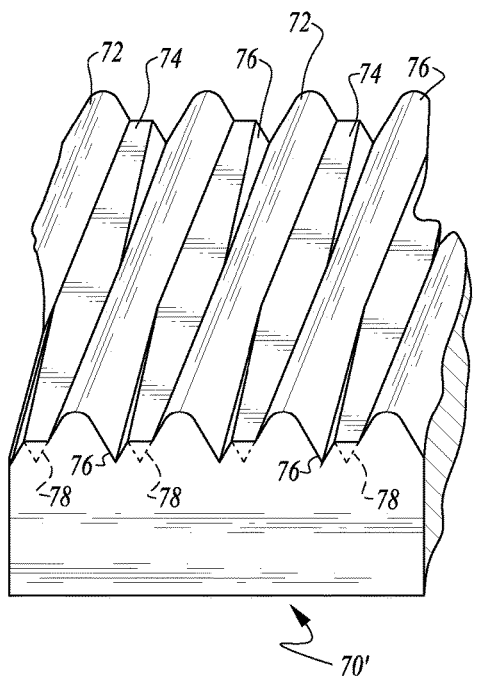
FIG. 17 is a detail of that which is shown in FIG. 16, but after a series of flank cuts have been made within roots in the forming surface by the fine thread cutting tool of FIGS. 19-21 to form the fine thread forming bridges within the roots of the die.
Figure 18:
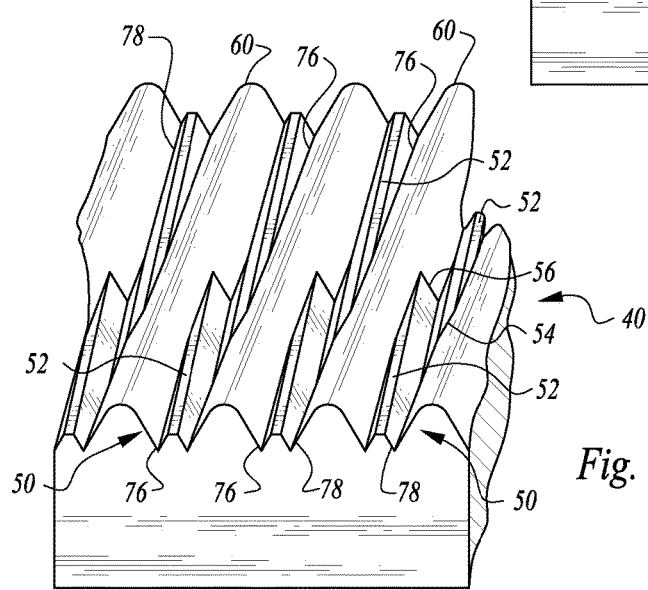
FIG. 18 is a detail similar to that which is shown in FIG. 17, but after a second set of flank cuts have been made by the fine thread cutter so that the dual threaded die is shown completely formed, similar to the finished die of FIGS. 7-12.

With particular reference to FIGS. 16-18, the fine thread cutter 20 is utilized on the partially formed dual threaded die 70 (FIG. 16) which had been previously formed by the truncated coarse thread cutter 10. The fine thread cutter 20 is oriented at an angle relative to side edges 46 of the dual threaded die 40 (FIGS. 7-12) which is less than the angle at which the truncated coarse thread cutter 10 was oriented (or other angle in other embodiments). For instance, if the coarse thread cutter 10 was oriented at 10° away from parallel with the side edges 46, the fine thread cutter 20 would be oriented at less than 10° away from parallel with the side edges 46, in this exemplary embodiment.

The fine thread cutter 20 makes a series of flank cuts which cut opposite flanks of each bridge 52. The first bridge flank cuts 76 are depicted in FIG. 17 which cut the left side of each bridge into the forming surface 42 of the dual threaded die 40 (FIGS. 8-12). These first bridge flank cuts 76 are not of constant depth, but rather transition from being shallow adjacent a start 54 of each bridge 52, then transitioning to a deepest portion for a middle of the bridge 52 and then returning to a shallow depth adjacent the stop 56 of the bridge 52. Because the shoulder 27 of the fine thread cutter 20 has an angle similar to that of the slopes 13 of the notches 19 and the sides of the crests 60 (FIGS. 8-12) the fine thread cutter 20 does not cut into the material forming the crests 60, but only cuts into the roots 50 and up against one flank of the bridge 52.

The same fine thread cutter 20 tool is utilized in a second pass to form second bridge flank cuts 78 (FIGS. 17 and 18). After this second set of passes with the fine thread cutter 20, both of the flanks of the bridges 52 have been cut and the partially formed dual threaded die 70 is transitioned from having only one flank of the bridge 52 cut thereon, as depicted by the partially formed dual threaded die 70' (FIG. 17) to forming the completed dual threaded die 40 (FIGS. 7-12 and 18) after the second bridge flank cuts 78 have been completed.

While the first bridge flank cuts 76 are described above as occurring first with all second bridge flank cuts 78, an alternative would be to make one first bridge flank cut 76 followed by a second bridge flank cut 78, to complete a first bridge 52 (FIG. 18) and then continue to the location where the next bridge 52 is required and make another pair of first bridge flank cuts 76 and second bridge flank cuts 78, and so on until all of the bridges 52 are formed within all of the roots 50 between adjacent crests 60 in the forming surface 42 of the die 40. Multiple fine thread cutters 20 might also be spaced on a common drive shaft and cut the various first bridge flank cuts 76 simultaneously as well as cutting the second bridge flank cuts 78 simultaneously. Furthermore, while the truncated coarse thread cutter 10 removes a majority of the material with a rougher tool for more efficient cutting of the forming surface 42 of the dual threaded die 40, it is conceivable that the fine thread cutter 20 could cut more than just the flanks of the bridges 52, but also form at least portions of the flanks of the crest 60, and potentially even the entire crests 60.

After cutting with the fine thread cutter 20, the dual threaded die 40 is complete and ready for use in roll forming of a screw such as the dual threaded bolt B (FIGS. 1-6). Most preferably, this roll forming occurs with one dual thread die 40 and one standard die 90 facing each other. However, it is conceivable that a pair of dual threaded dies 40 could be utilized. The standard die has coarse threads 95 alone that extend between a root 50' and a crest 60'. Dimensions of the root 50' and crest 60' match those of the root 50 and crest 60 of the dual thread die 40, except that the bridges 52 are not present.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A method for making a die for roll forming a dual threaded bolt, the die forming method including the steps of:
   identifying a block of die forming material having a substantially flat forming surface between a pair of opposing side edges and opposing lead and rear edges;
   cutting the forming surface with a truncated coarse thread cutter to form upper portions of a series of parallel coarse thread crests;
   further cutting the forming surface with a separate cutter between the upper portions of the series of parallel coarse thread crests to form roots between the coarse thread crests, the roots including bridges therein angled relative to the crests and extending between adjacent crests; and
   wherein said cutting step includes using the truncated coarse thread cutter having a circular form with cutting teeth on a perimeter, the cutting teeth having a notch defining two shoulders defining a cutting tip, matching a contour of the upper portions of the coarse thread crests, to form the upper portions of the coarse thread crests.

2. The method of claim 1 wherein said cutting step includes the truncated coarse thread cutter notch located midway between the shoulders of the truncated coarse thread cutter.

* * * * *